United States Patent
Amano et al.

(10) Patent No.: US 7,021,805 B2
(45) Date of Patent: Apr. 4, 2006

(54) VEHICLE LAMP

(75) Inventors: Yasuyuki Amano, Shizuoka (JP); Yasuo Teranishi, Shizuoka (JP); Hiroya Koizumi, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 125 days.

(21) Appl. No.: 10/611,107

(22) Filed: Jul. 2, 2003

(65) Prior Publication Data

US 2004/0070989 A1   Apr. 15, 2004

(30) Foreign Application Priority Data

Jul. 4, 2002   (JP) .......................... P.2002-196595

(51) Int. Cl.
*F21V 7/00*   (2006.01)

(52) U.S. Cl. ........................ 362/518; 362/307; 362/328

(58) Field of Classification Search ........ 362/517–522, 362/321, 331, 307, 327; 359/726, 720, 730–732
See application file for complete search history.

(56) References Cited

U.S. PATENT DOCUMENTS

| | | | |
|---|---|---|---|
| 4,037,096 A * | 7/1977 | Brendgord et al. ......... | 362/294 |
| 4,630,184 A * | 12/1986 | Ferrero ....................... | 362/351 |
| 4,740,871 A * | 4/1988 | Dilouya ...................... | 362/518 |
| 5,453,855 A | 9/1995 | Nakamura et al. | |
| 5,684,633 A * | 11/1997 | Lutz et al. .................. | 359/588 |
| 6,097,549 A * | 8/2000 | Jenkins et al. .............. | 359/726 |
| 6,811,277 B1 * | 11/2004 | Amano ........................ | 362/31 |
| 6,814,475 B1 * | 11/2004 | Amano ....................... | 362/487 |
| 2004/0027833 A1 * | 2/2004 | Amano et al. .............. | 362/507 |

FOREIGN PATENT DOCUMENTS

| | | |
|---|---|---|
| DE | 196-38-081 A1 | 3/1998 |
| JP | 61-153201 | 9/1986 |
| JP | 7-228189 A | 8/1995 |
| JP | 2003-31010 A | 1/2003 |
| JP | 2003-81009 A | 3/2003 |
| WO | WO 02/076788 A1 | 10/2002 |

* cited by examiner

Primary Examiner—John Anthony Ward
(74) Attorney, Agent, or Firm—Sughrue Mion, PLLC

(57) ABSTRACT

A translucent member is arranged so as to cause light originating from an LED light source oriented toward the front of a lamp to enter the translucent member. Outgoing LED light that has entered the translucent member is reflected rearward by a front surface, and then the light is reflected forward by a rear surface, to thereby exit forward of the lamp from the translucent member. At that time, an area on the front surface located in the vicinity of an optical axis Ax is formed as a normal reflection section subjected to reflection surface treatment. The other area of the front surface is formed as an internal reflection section which causes the outgoing LED light to undergo internal reflection. A plurality of reflection elements are formed on the rear surface of the translucent member so as to cause the outgoing LED light reflected from the front surface to enter the internal reflection section at an incidence angle which is smaller than or equal to a critical angle.

9 Claims, 10 Drawing Sheets

VEHICLE LAMP

BACKGROUND OF THE INVENTION

1. Field of the Invention

The present invention relates to a vehicle lamp equipped with an LED (light-emitting diode). More particularly, the invention relates to a vehicle lamp equipped with an LED including a normal reflection section and an internal reflection section which, when used in conjunction with a plurality of reflection elements having multiple configuration placements, are operable to control reflection and the outgoing light.

2. Description of the Related Art

Many vehicle lamps equipped with an LED have been recently adopted. In this regard, JP-UM-A-61-153201 describes a vehicle lamp equipped with an LED light source oriented forward of the vehicle lamp. Further, a translucent member is arranged such that light originating from the LED light source is caused to enter the translucent member. The light that has originated from the LED light source and entered the translucent member is reflected rearward by a front surface of the translucent member. The thus-reflected rearward light is then reflected forward by a rear surface, whereupon the light exits forward of the lamp from the translucent member.

Such a vehicle lamp can reflect backward, by means of internal reflection, light which enters the translucent member at a large angle with respect to an optical axis of the LED light source from among the light which has originated from the LED light source and entered the front surface of the translucent member. However, the light that enters the translucent member at a small angle with respect to the optical axis assumes an incident angle which is smaller than or equal to a critical angle. Hence, the light cannot be reflected rearward through internal reflection.

As described in the Japanese Patent Publication, if an area on the front surface of the translucent member located in the vicinity of the optical axis is formed into a recessed section of a wedge-shaped cross-sectional profile, the light originating from the LED light source can be caused to enter the wedge-shaped recessed section at an angle exceeding the critical angle. As a result, the light originating from the LED light source can be utilized efficiently as lamp illumination light.

However, when such a lamp structure is adopted, an overlap exists between an area on the rear surface of the translucent member, where the light that has been subjected to internal reflection on the wedge-shaped recessed section (i.e., wedged-recess-reflected light) enters, and an area on the front surface of the translucent member where the light that has been subjected to internal reflection on areas other than the wedge-shaped recessed section (i.e., general-section-reflected light) enters. If the geometry of the rear surface of the translucent member is set so as to enable appropriate control of reflection of the general-section-reflected light, there arises a problem of inability to appropriately control reflection of the wedged-recess-reflected light.

The invention has been conceived to overcome these problems with the related art and is aimed at providing a vehicle lamp which is equipped with an LED light source and enables efficient utilization the light originating from the LED light source as lamp illumination light and appropriate control of the lamp illumination light.

SUMMARY OF THE INVENTION

The invention achieves the foregoing object by designing, the configuration of a front surface of a translucent member.

Specifically, the invention provides a vehicle lamp which includes a light source, and preferably an LED light source, oriented toward the front of a lamp, and a translucent member arranged so as to cause LED light going out from the LED light source to enter the translucent member and which is configured to reflect rearward the light that has originated from the LED light source and entered the translucent member by a front surface of the translucent member and then to reflect the light by a rear surface of the translucent member, to thereby cause the light to exit the front of the lamp from the translucent member, wherein an area on the front surface of the translucent member located in the vicinity of an optical axis of the LED light source is formed as a normal reflection section subjected to reflection surface treatment, and an area of the front surface of the translucent member other than the normal reflection section is formed as an internal reflection section which causes the outgoing LED light having entered the translucent member to undergo internal reflection; and wherein a plurality of reflection elements are formed on the rear surface of the translucent member for subjecting the outgoing LED light reflected from the front surface to reflection so as to enter the internal reflection section at an incidence angle which is smaller than or equal to a critical angle.

Here, the term "vehicle lamp" is not limited to a vehicle lamp of specific type. For instance, a tail lamp, a stop lamp, or another lamp can be adopted.

In addition, the term "translucent member" is not limited to a specific material, so long as the material is a member possessing translucency. For example, a material formed from transparent synthetic resin or glass can be adopted.

No particular limitations are imposed on the range where the "normal reflection section" and "internal reflection section" are formed, and no specific plane shapes are required.

In relation to the respective "reflection elements," the shape of the reflection surface is not limited to any specific shape, so long as the reflection surface reflects the light that has originated from the LED light source and reflected from the front surface of the translucent member so as to enter the internal reflection section at an incident angle smaller than or equal to a critical angle. For instance, there may be employed a reflection element which merely subjects the light exiting from the front surface of the translucent member to regular reflection. Alternatively, there may be employed a reflection element configured to subject the light exiting from the front surface of the translucent member to diffuse reflection.

As can be seen from the above-described configuration, a vehicle lamp of the invention is configured such that a translucent member is arranged so as to cause light originating from an LED light source oriented toward the front of a lamp to enter the translucent member and such that outgoing LED light that has entered the translucent member is reflected rearward by a front surface and then reflected forward by a rear surface, to there by exit forward of the lamp from the translucent member. An area on the front surface of the translucent member located in the vicinity of an optical axis of the LED light source is formed as a normal reflection section subjected to reflection surface treatment. An area of the front surface of the translucent member other than the normal reflection section is formed as an internal reflection section which causes the outgoing LED light having entered the translucent member to undergo internal reflection. A plurality of reflection elements are formed on the rear surface of the translucent member for subjecting the outgoing LED light reflected from the front surface of the translucent member to reflection so as to enter the internal reflection section at an incidence angle which is smaller than or equal to a critical angle. Hence, the following working-effects can be yielded.

Even when the normal reflection section, having been subjected to reflection surface treatment, is arranged so as to cause the light that has originated from the LED light source and entered the translucent member to enter the normal reflection section at an incidence angle smaller than or equal to the critical angle, the light can be reflected without fail. Hence, the surface geometry of the normal reflection section can be set freely. Therefore, the area on the rear surface of the translucent member where the light reflected from the normal reflection section enters and the area on the rear surface where the light having undergone internal reflection on the internal reflection section enters can be readily set so as not to overlap each other. As a result, reflection control can be appropriately performed by means of a rear surface of the translucent member.

Consequently, according to the invention, the vehicle lamp equipped with an LED light source enables efficient utilization of the light originating from the LED light source as lamp illumination light, as well as appropriate control of the lamp illumination light.

As mentioned previously, no particular limitations are imposed on the surface geometry of the normal reflection section and that of the internal reflection section. Provided that the normal reflection section is formed from a substantially-funnel-shaped rotary curved surface centered on the optical axis and that the internal reflection section is formed from a substantially-annular-dome-shaped rotary curved surface centered on the optical axis, the following working-effect can be achieved.

Specifically, the light originating from the LED light source can be reflected from the front surface of the translucent member over the entire circumference of the optical axis, to thereby cause the light to enter a rear surface of the translucent member. Hence, a wide illumination area can be ensured by means of a single LED light source. Further, the LED light source can be placed at the center of the lamp, and hence the outer geometry of the lamp can be set freely.

In connection with the configuration, so long as the normal reflection section and the internal reflection section are formed from continuous curved surfaces, the area on the rear surface of the translucent member where the light reflected from the normal reflection section enters and the area on the rear surface where the light having undergone internal reflection on the internal reflection section enters can be made adjacent to each other without involvement of an overlap or separation. As a result, there can be eliminated a risk of a dark swath or the like arising on the rear surface of the translucent member when observed from the front of the vehicle lamp while the LED light source is illuminated.

At that time, the following working-effect can be yielded by setting the position of a boundary line between the normal reflection section and the internal reflection section to a position where the incidence angle of the light originating from the LED light source becomes equal to a substantially critical angle.

Specifically, when the vehicle lamp is observed from the front while the LED light source is illuminated, the normal reflection section subjected to reflection surface treatment appears to be dark. Hence, the area of the normal reflection section to be subjected to reflection surface treatment is preferably minimized. For these reasons, if the position of the boundary line between the normal reflection section and the internal reflection section is set to a position where the incidence angle of the light that has originated from the LED light source and entered the front surface of the translucent member becomes equal to a substantially critical angle, the normal reflection section can be set to the minimum size while the light originating from the LED light source is reflected rearward from the front surface of the translucent member without any substantial leakage.

In relation to the configuration, if the plurality of reflection elements formed on the rear surface of the translucent member are formed at positions rearward of the luminescent center of the LED light source, the LED light source and the substrate supporting this can be arranged so as not to project greatly rearward from the rear surface of the translucent member, thereby rendering the lamp slim.

DETAILED DESCRIPTION OF THE INVENTION

Embodiments of the invention will be described herein below by reference to the accompanying drawings.

Figure 1:
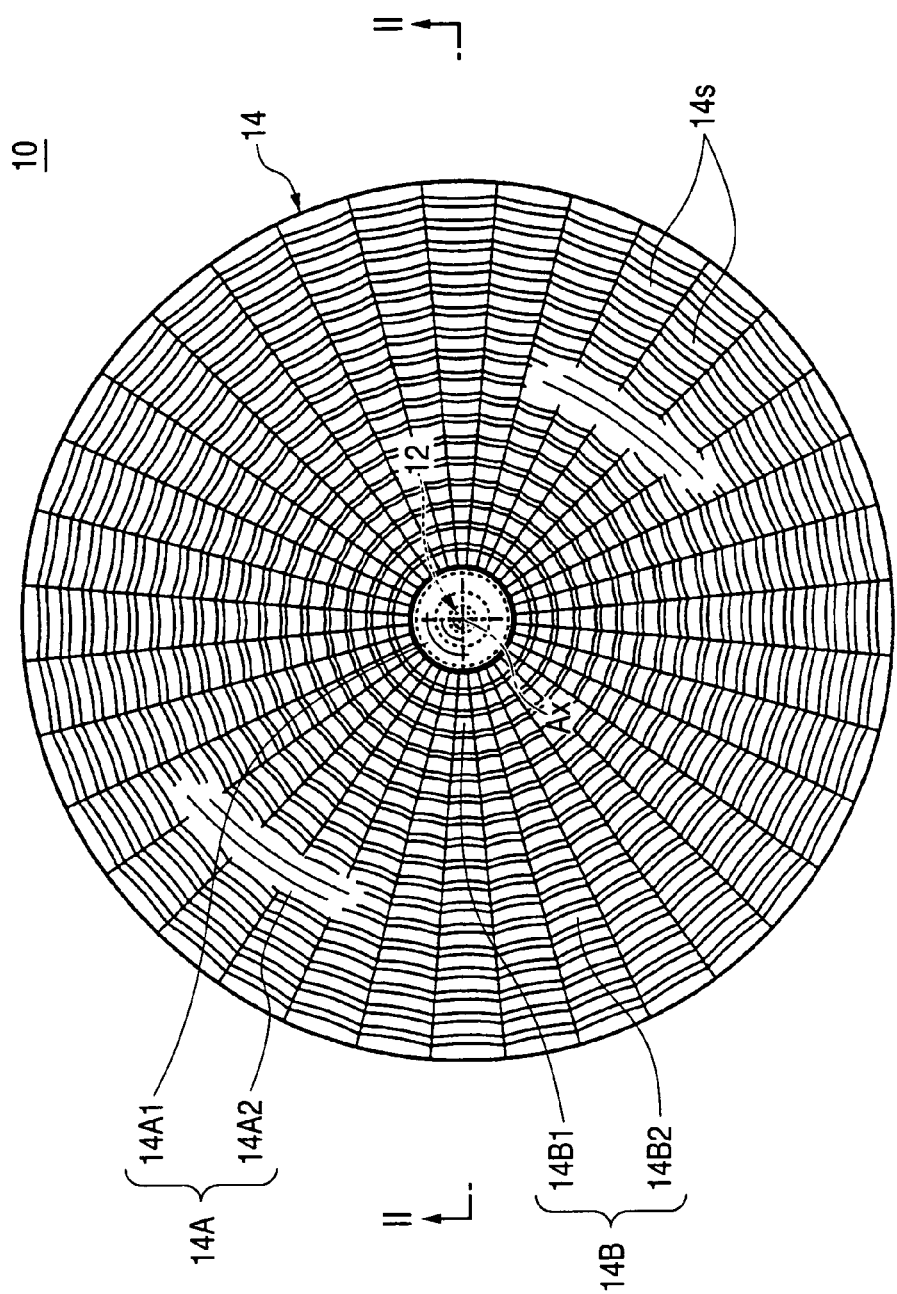
FIG. 1 is a front view showing a vehicle lamp according to an embodiment of the invention.
Figure 2:
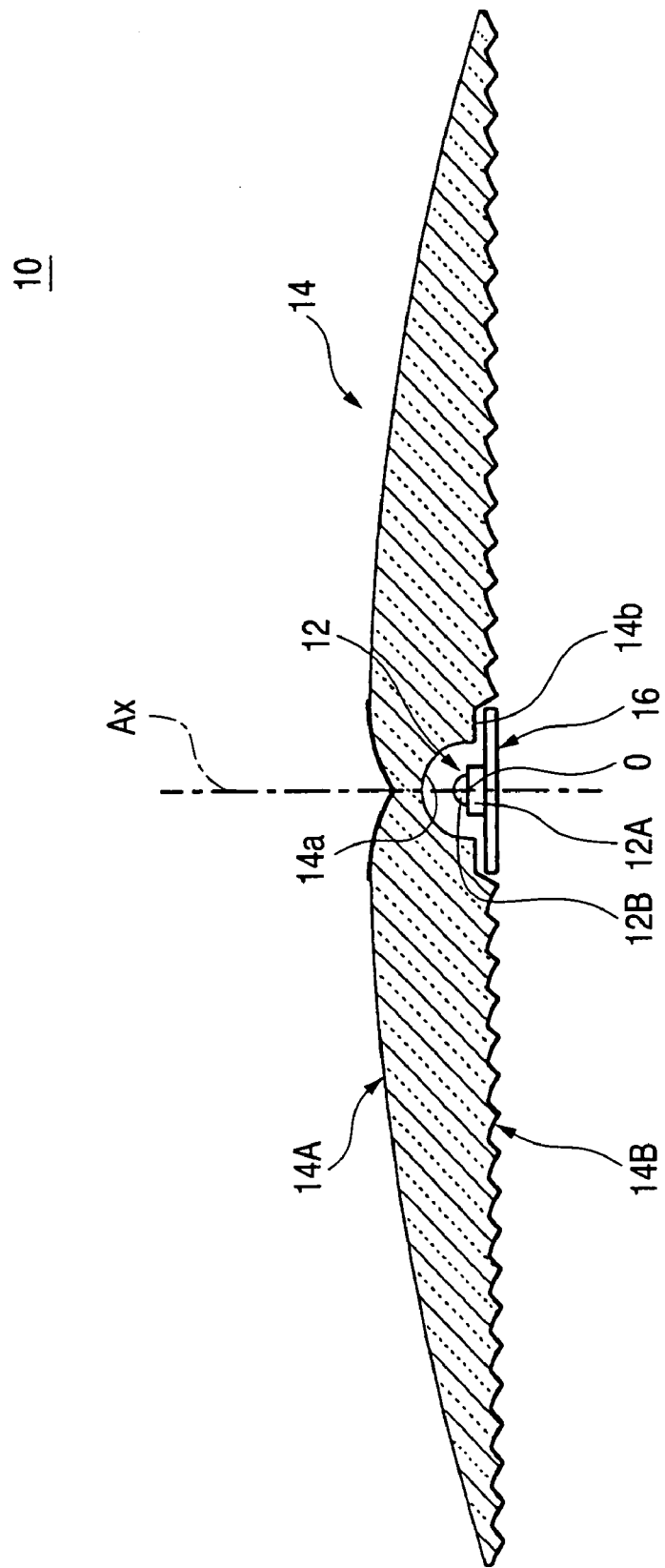
FIG. 2 is a cross-sectional view taken along line II-II shown in FIG. 1.
Figure 3:
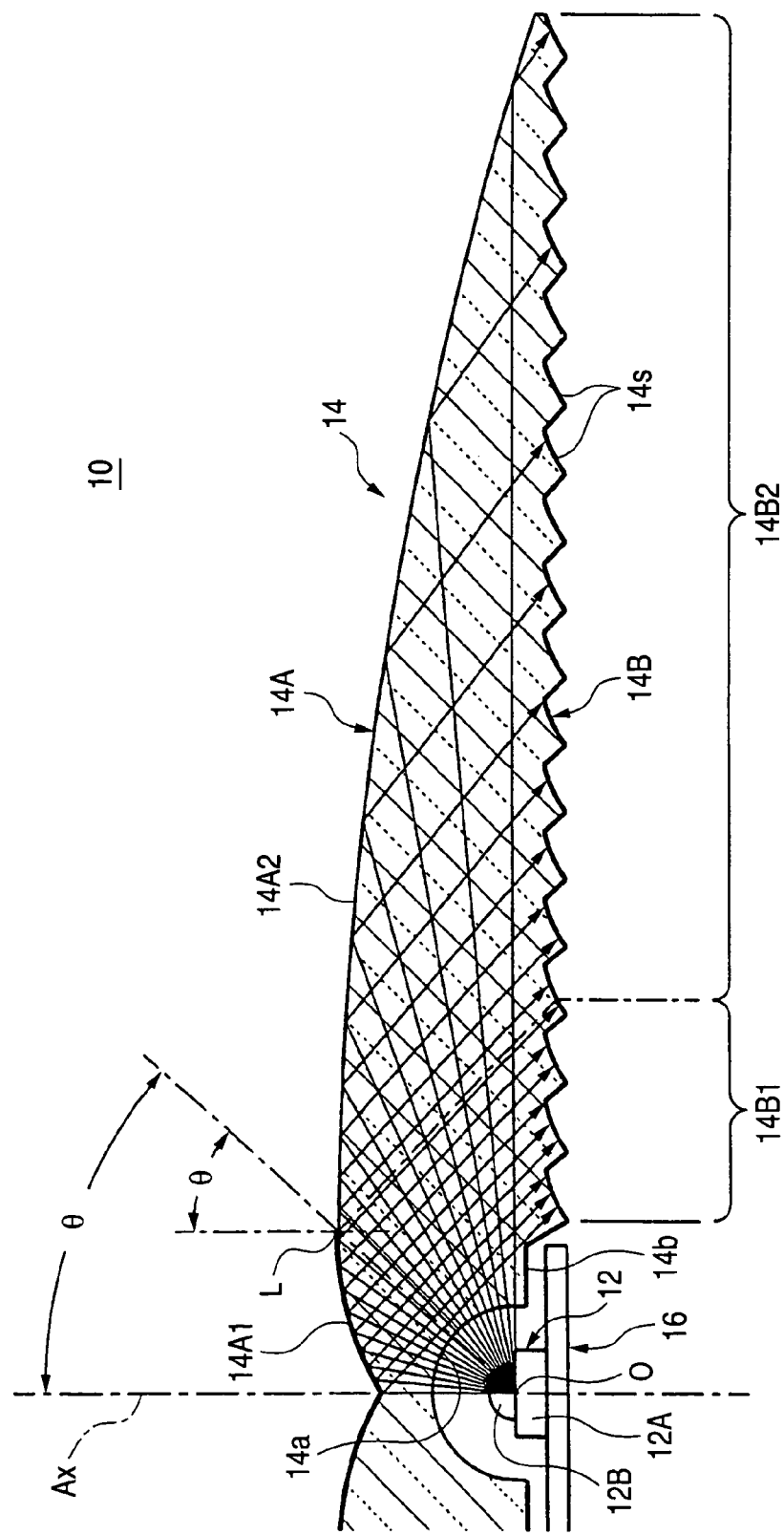
FIG. 3 is a detailed view of the featured section of the vehicle lamp shown in FIG. 2 (part 1)
Figure 4:
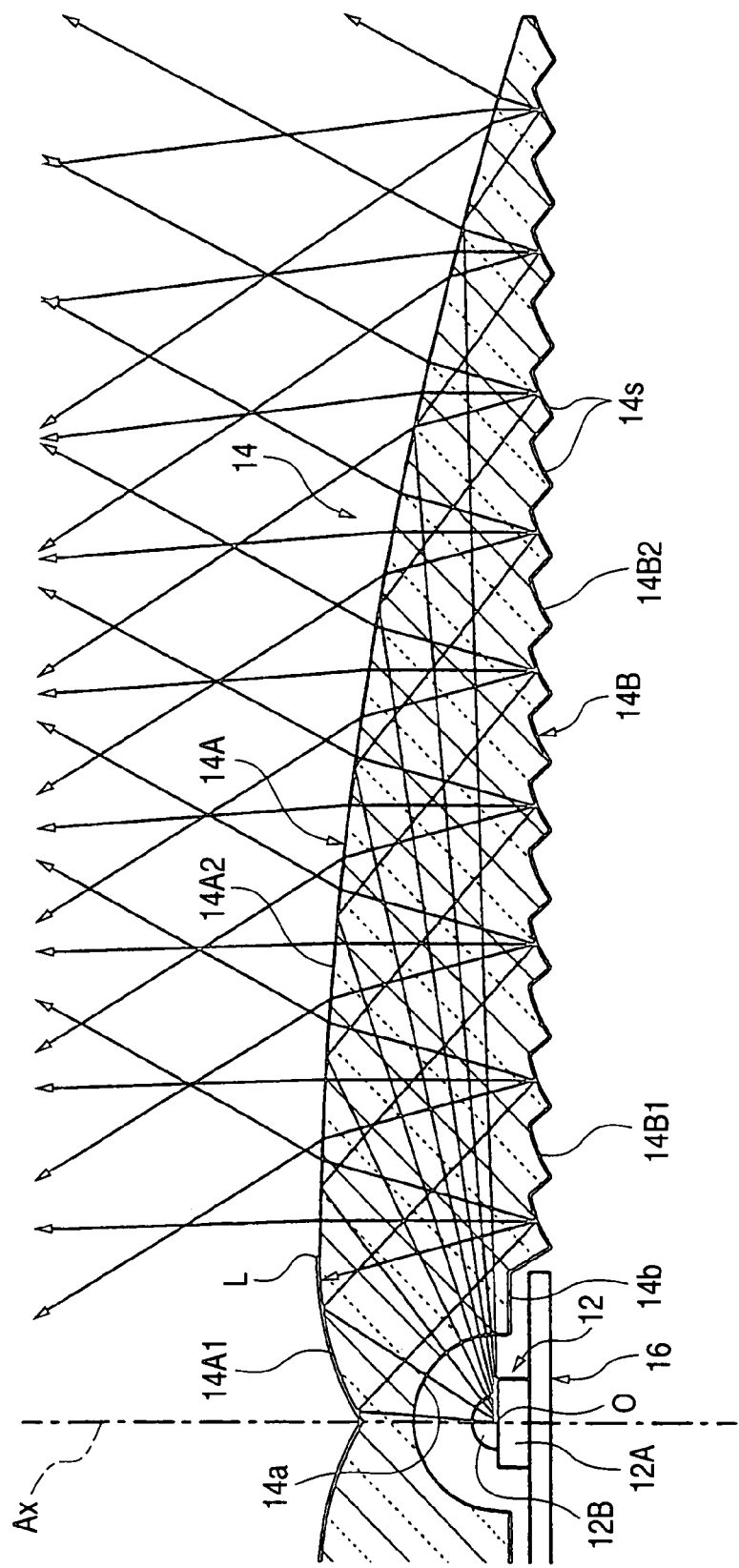
FIG. 4 is a detailed view of the featured section of the vehicle lamp shown in FIG. 2 (part 2)

FIG. 1 is a front view showing a lamp vehicle according to an embodiment. FIG. 2 is a cross-sectional view taken along line II-II shown in FIG. 1. FIGS. 3 and 4 are detailed views of the featuring section shown in FIG. 2.

As illustrated, a vehicle lamp 10 of the embodiment is a tail lamp provided at a rear end section of the vehicle and comprises an LED light source 12 and a translucent member 14.

The LED light source 12 is oriented ahead of a lamp (i.e., a rearward direction of a vehicle (and this applies to any counterparts in the following descriptions) such that an optical axis Ax is brought into alignment with the center axis of the lamp extending in a longitudinal direction of the vehicle. The LED light source 12 is formed from an LED main body (LED chip) 12A and sealing plastic or resin 12B which covers the luminescent center O of the LED main body 12A. The LED light source 12 is fixed to a substrate 16.

The translucent member 14 is formed from a substantially dome-shaped, transparent synthetic resin molded product (e.g., an acrylic resin molded product) and arranged so as to cover the LED light source 12 from the front. The translucent member 14 reflects rearward the light that has originated from the LED light source 12 and entered the translucent member 14, by means of a front surface 14A of the translucent member 14. Subsequently, the light is then reflected forward by means of a rear surface 14B of the translucent member 14 so as to exit from the translucent member 14 toward the front of the lamp.

A light incidence recess 14a is formed in the center of the rear surface 14B of the translucent member 14 for causing the light originating from the LED light source 12 (also called "outgoing LED light") to enter the translucent member 14.

An area on the front surface 14A of the translucent member 14 located in the vicinity of the optical axis Ax is formed as a normal reflection section 14A1 subjected to reflection surface treatment through deposition of aluminum. An area on the front surface 14A of the translucent member 14 other than the normal reflection section 14A1 is formed as an internal reflection section 14A2 for subjecting the outgoing LED light that has entered the translucent member 14 to internal reflection.

The normal reflection section 14A1 is formed from a substantially-funnel-shaped rotary curved surface centered on the optical axis Ax. The internal reflection section 14A2 is formed from a substantially-annular-dome-shaped rotary curved surface centered on the optical axis Ax. The normal reflection section 14A1 and the internal reflection section 14A2 are formed from continuous curved surfaces. The position of the boundary line L is set such that an incidence angle θ at which the outgoing LED light enters the front surface 14A of the translucent member 14 becomes substantially equal to a critical angle of incidence (about 42°).

In the embodiment, the direction of the normal on the boundary line L of the front surface 14A of the translucent member 14 is set so as to become parallel with the optical axis Ax. Consequently, an angle formed between the outgoing LED light entering at the position of the boundary line L and the optical axis Ax becomes equal to the incidence angle θ of the outgoing LED light on the boundary line L.

In the embodiment, the cross-sectional profile of the normal reflection section 14A within a plane including the optical axis Ax is set to a parabolic pattern which takes the luminescent center O as a focal point. Meanwhile, the cross-sectional profile of the internal reflection section 14A2 within the plane is set to a hyperbolic pattern which takes the luminescent center O as a focal point.

As shown in FIG. 3, of the outgoing LED light reflected from the front surface 14A of the translucent member 14, the outgoing LED light reflected from the normal reflection section 14A1 enters an internally-peripheral region 14B1 of the rear surface 14B of the translucent member 14. The outgoing LED light reflected from the internal reflection section 14A2 enters an outer-peripheral region 14B2 of the rear surface 14B of the translucent member 14.

An annular recess 14b is formed around the light incidence recess 14a of the rear surface 14B of the translucent member 14. Further, a plurality of reflection elements 14s are formed around the annular recess 14b. The reflection elements 14s are arranged at equal intervals and in the form of a saw-toothed pattern in a plane orthogonal to the optical axis Ax located rearward with respect to the luminescent center O of the LED light source 12 such that the rear surfaces 14B of the translucent member 14 are radially and concentrically separated from each other. An area on the rear surface 14B of the translucent member 14 other than the light incidence recesses 14a is subjected to reflection surface treatment through deposition of, for example, aluminum.

Each of the reflection elements 14s is formed into a convex curved surface having a predetermined curvature in a radial and circumferential direction with respect to the optical axis Ax. As shown in FIG. 4, the LED light outgoing from the front surface 14A of the translucent member 14 is diffused and reflected in a radial and circumferential direction with respect to the optical axis Ax. At that time, the surface geometry of each of the reflection elements 14s is formed so as to cause the outgoing LED light reflected from the front surface 14A of the translucent member 14 to enter the internal reflection section 14A2 at an incidence angle which is smaller than or equal to the critical angle through reflecting action of the reflection elements 14s.

Figure 5:
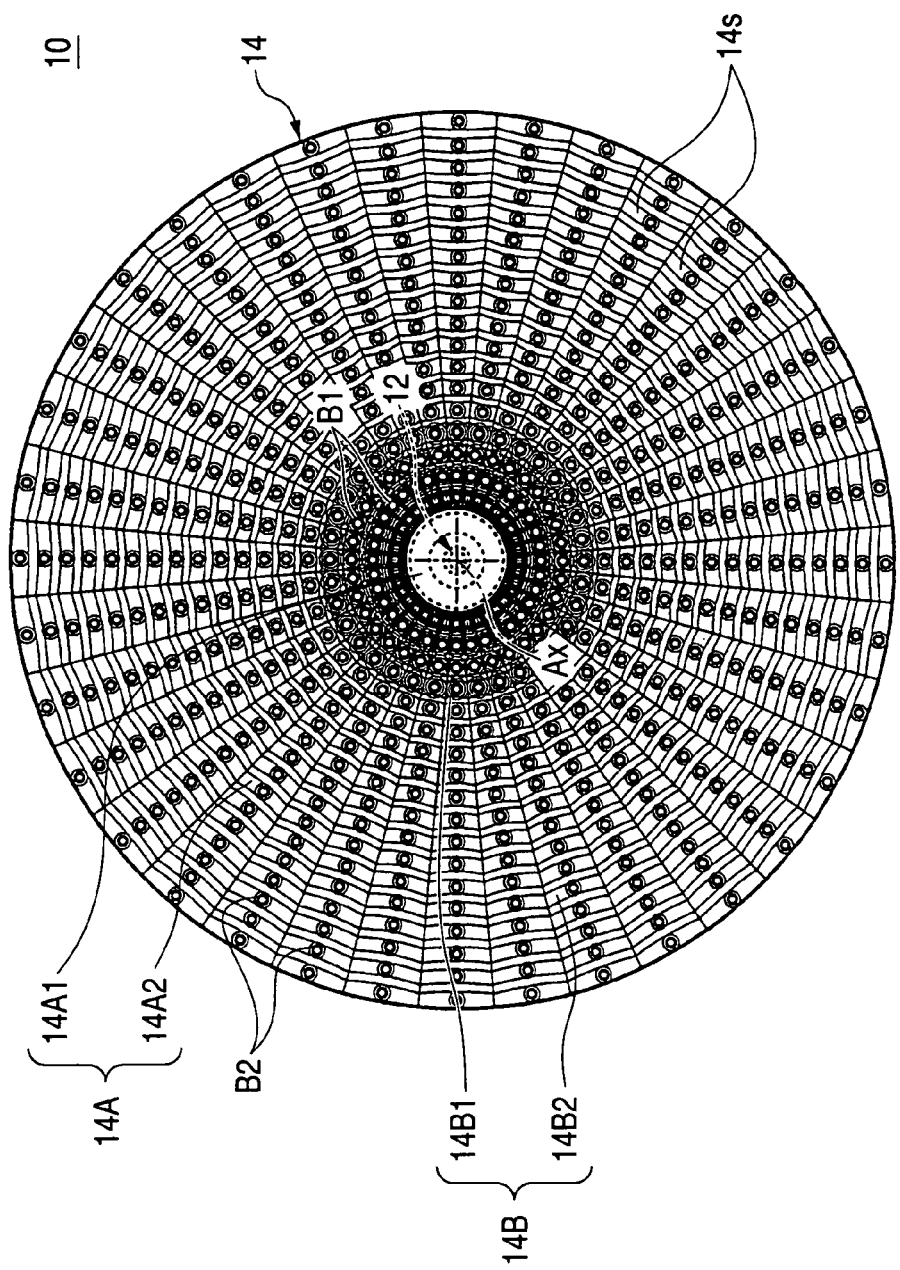
FIG. 5 is a front view showing the vehicle lamp in an illuminated state.

FIG. 5 is a front view of the vehicle lamp 10 of the embodiment, showing that the LED light source 12 is illuminated.

As illustrated, when the vehicle lamp 10 is observed from the front, the plurality of reflection elements 14s constituting the rear surface 14B of the translucent member 14 appear to simultaneously glow, in the manner of spread spots. At that time, each of the reflection elements 14s is formed into a convex curved surface. Hence, substantial center portions of the respective reflection elements 14s appear to glow brightly as glaring sections B1, B2. The luminous exitance of the light reflected from the inner peripheral region 14B1 of the rear surface 14B of the translucent member 14 is greater than that of the light reflected from the outer peripheral region 14B2. Hence, the glaring sections B1 of the inner peripheral region 14B1 appear to glow brighter than the glaring sections B2 of the outer peripheral region 14B2.

Even when the eyepoint has been slightly deviated from the front of the lamp, the portions of the reflection elements 14s deviated from the substantial center appear to glow as the glaring sections B1, B2 in accordance with the amount of movement of the eyepoint, because the respective reflection elements 14s are formed into the convex curved shape.

As has been described in detail, the vehicle lamp 10 of the embodiment is constructed such that the translucent member 14 is arranged so as to cause the light originating from the LED light source 12 oriented toward the front of the lamp to enter the translucent member 14; and such that the outgoing LED light having entered the translucent member 14 is reflected rearward by the front surface 14A and again reflected forward by the rear surface 14B, to thereby exit the front of the lamp from the translucent member 14. The area on the front surface 14A of the translucent member 14 located in the vicinity of the optical axis Ax is formed as the normal reflection section 14A1 that has been subjected to reflection surface treatment. The area on the front surface 14A other than the normal reflection section 14A1 is formed as the internal reflection section 14A2 for subjecting the outgoing LED light having entered the translucent member 14 to internal reflection. The plurality of reflection elements 14s are formed on the rear surface 14B of the translucent member 14 so as to cause the outgoing LED light reflected from the front surface 14A of the translucent member 14 to enter the internal reflection section 14A2 at an incidence angle smaller than or equal to the critical angle. Hence, the following working-effects can be yielded.

Specifically, even when the outgoing LED light is caused to enter the normal reflection section 14A1 at an incidence angle equal to or smaller than the critical angle, the normal reflection section 14A1 having been subjected to reflection surface treatment can reflect the incident light without fail. Hence, the surface geometry of the normal reflection section 14A1 can be set freely. Therefore, the rear surface 14B of the translucent member 14 can be set readily so as to avoid occurrence of an overlap between the area where the light reflected from the normal reflection section 14A1 enters (i.e., the inner peripheral region 14B1) and the area where the light having been subjected to internal reflection on the internal reflection section enters (i.e., the outer peripheral region 14B2). As a result, the rear surface 14B of the translucent member 14 can perform appropriate control operation.

According to the embodiment, the outgoing LED light can be utilized efficiently as lamp illumination light. Control of the lamp illumination light can be performed appropriately.

Particularly, in the embodiment, the normal reflection section 14A1 is formed from the substantially-funnel-shaped rotary curved surface centered on the optical axis Ax. The internal reflection section 14A2 is formed from a substantially-annular dome-shaped rotary curved surface centered on the optical axis Ax. The following working-effect can be yielded.

The outgoing LED light can be subjected to reflection on the front surface 14A of the translucent member 14 over the entire circumference of the optical axis Ax. The LED light can then be caused to enter the rear surface 14B. Hence, a wide luminous area can be ensured by means of only one LED light source 12 since the LED light source 12 can be placed at the center of the lamp, the outer shape of the lamp can be set freely.

In the embodiment, the normal reflection section 14A1 and the internal reflection section 14A2 are formed from continuous surfaces. Hence, the area on the rear surface 14B of the translucent member 14 where the light reflected from the normal reflection section 14A1 enters and the area on the rear surface 14B of the translucent member 14 where the light having been subjected to internal reflection on the internal reflection section 14A2 enters can be made adjacent to each other without involvement of occurrence of separation or an overlap. As a result, there can be obviated a risk of occurrence of a swath dark section or the like, which would otherwise be caused when the vehicle lamp 10 is observed from the front while the LED light source 12 is illuminated.

At this time, in the embodiment, the position of the boundary line L between the normal reflection section 14A1 and the internal reflection section 14A2 is set to a position where the incidence angle θ of the outgoing LED light having entered the front surface 14A of the light-shielding member 14 becomes a substantial critical angle. The outgoing LED light is reflected rearward by the front surface 14A of the translucent member 14 without any substantial leakage, so that the size of the normal reflection section 14A1 can be set to a minimum size.

In the embodiment, the plurality of reflection elements 14s formed on the rear surface 14B of the translucent member 14 are formed at a position rear rather than the luminescent center O of the LED light source 12. The LED light source 12 and the substrate 16 supporting the LED light source 12 can be arranged so as not to project greatly rearward from the rear surface 14B of the translucent member 14. As a result, the lamp can be made compact.

In the embodiment, the direction of the normal on the boundary line L of the front surface 14A of the translucent member 14 is described as being set parallel with the optical axis Ax. However, such a setting is not necessarily required. The setting can be made according to the size of the lamp or the like, as appropriate.

In the embodiment, the cross-sectional profile of the normal reflection section 14A1 within the plane including the optical axis Ax is set to the parabolic shape that takes the luminescent center O as a focal point. The cross-sectional profile of the internal reflection surface 14A2 within the plane is set to the hyperbolic shape that takes the luminescent center O as a focal point. However, other cross-sectional profiles can also be adopted.

A first modification of the embodiment will now be described.

Figure 6:
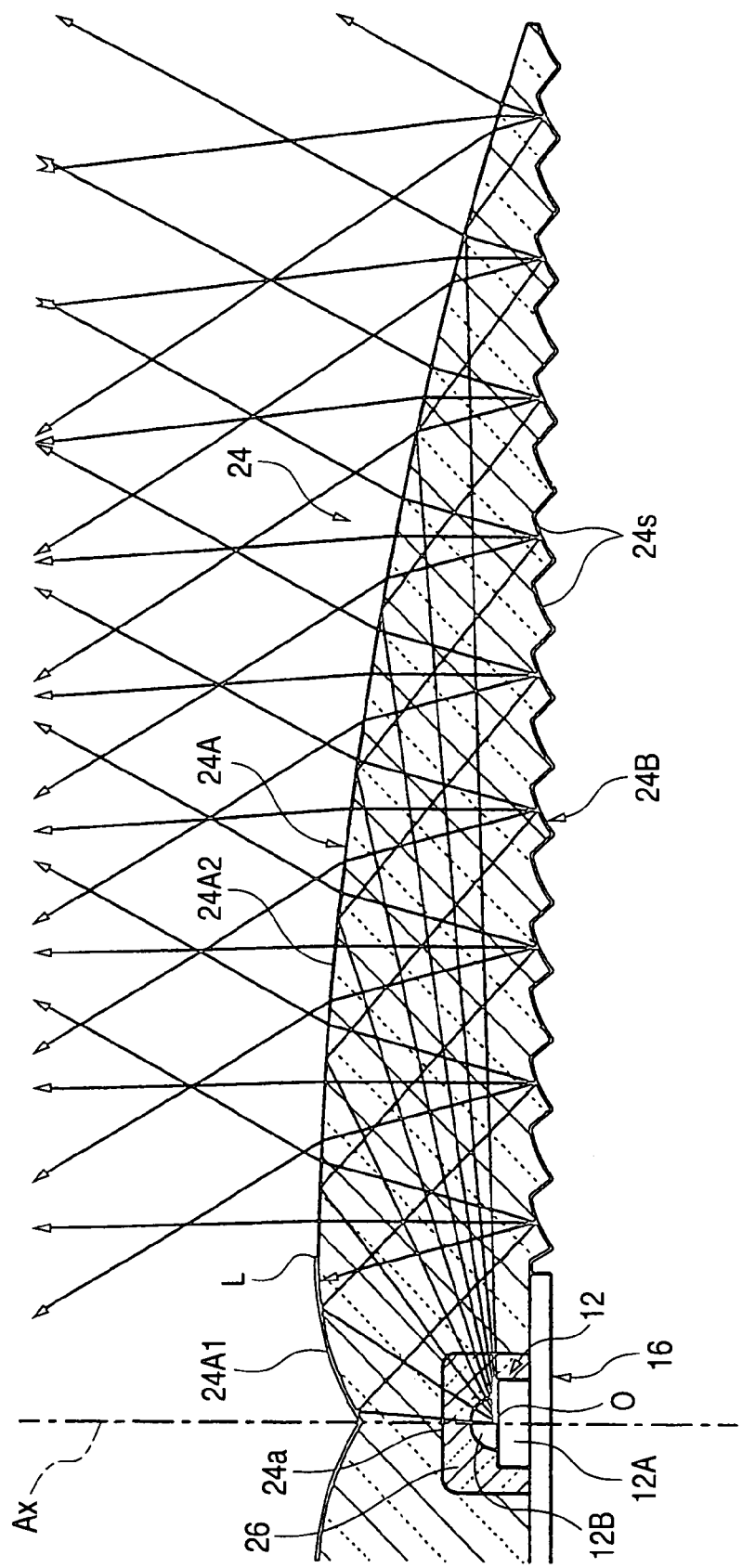
FIG. 6 is a view analogous to FIG. 4, showing a translucent member of a first modification of the embodiment.

FIG. 6 is a view analogous to FIG. 4, showing a translucent member 24 of the embodiment.

As illustrated, the translucent member 24 differs from the translucent member 14 in that the configuration of a light incidence recess 24a is different from the light incidence recess 14a of the translucent member 14 of the embodiment.

Specifically, the light incidence recess 24a of the translucent member 24 is formed into a cylindrical shape having a bottom. A transparent filler 26 is filled between the light incidence recess 24a and the sealing resin 12B of the LED light source 12. The filler 26 is formed from synthetic resin material whose refractive index is substantially equal to that of the transparent member 24. The outgoing LED light travels in the straight line through the transparent member 24 by way of the filler 26 from the luminescent center of the LED light source 12.

The normal reflection section 24A1 and the internal reflection section 24A2, both constituting the front surface 24A of the translucent member 24, and the plurality of reflection elements 24s formed on the rear surface 24B of the translucent member 24 are completely identical in shape with the translucent member 14 of the embodiment Even when the configuration of the modification is adopted, the same working-effect as that achieved in the embodiment can be achieved.

In the modification, the filler 26 that is substantially equal in refractive index to the translucent member 24 is filled between the light incidence recess 24a and the sealing resin 12B of the LED light source 12, thereby substantially preventing occurrence of retraction at a boundary surface between the filler 26 and the translucent member 24. Consequently, the shape of the light incidence recess 24a of the translucent member 24 can be set arbitrarily. In the modification, the light incidence recess 24a is set to a simple shape, such as a cylindrical shape having a bottom. However, as a matter of course, the light incidence recess can be set to a shape other than this.

A second modification of the embodiment will now be described.

Figure 7:
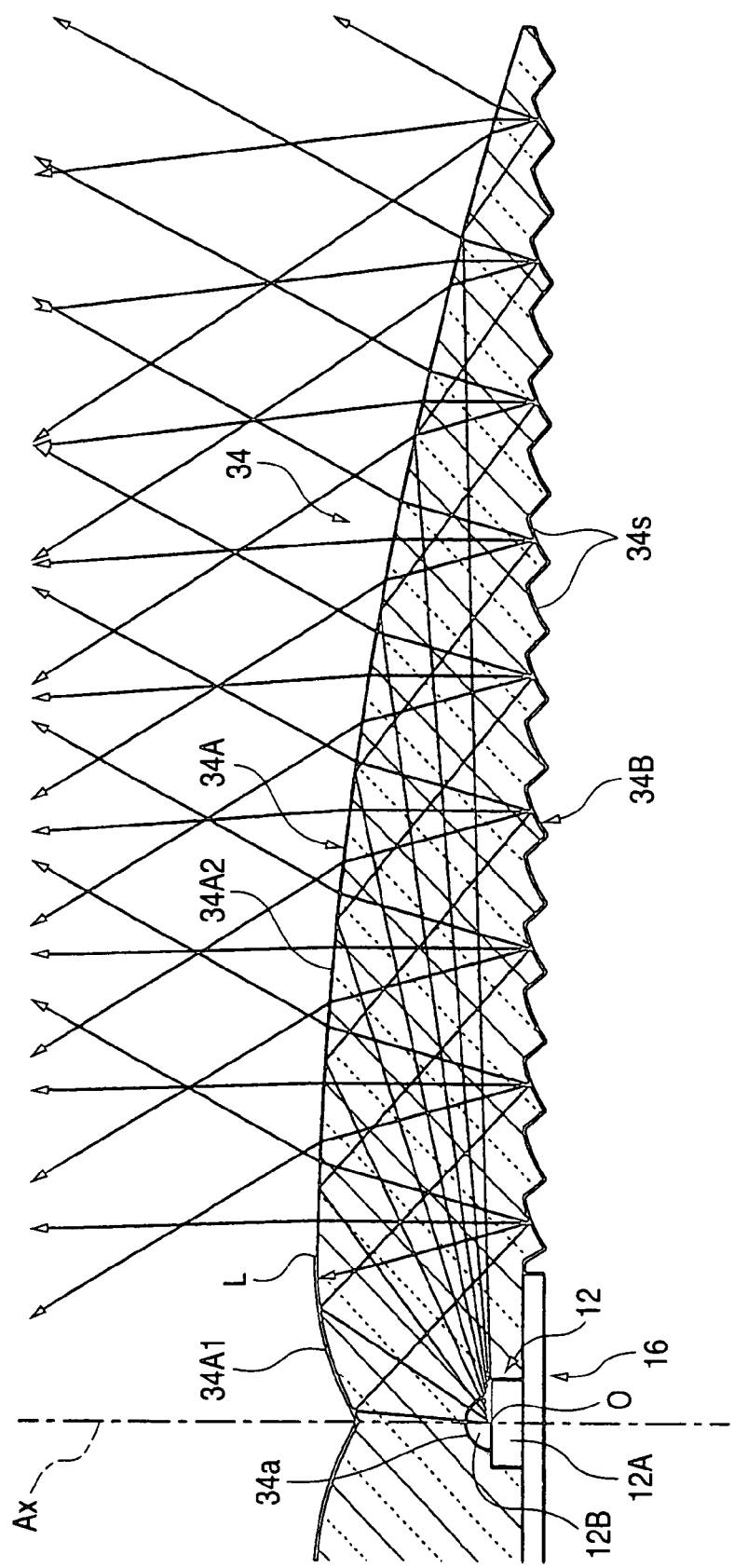
FIG. 7 is a view analogous to FIG. 4, showing a translucent member of a second modification of the embodiment.

FIG. 7 is a view analogous to FIG. 4, showing a translucent member 34 of the second-modification.

As illustrated, the translucent member 34 is characterized in that a light incidence recess 34a differs in configuration from the light incidence recess 14A of the translucent member 14 of the embodiment.

Specifically, the translucent member 34 is formed such that the light incidence recess 34a is brought into close contact with the sealing resin 12B of the LED light source 12. The outgoing LED light radially travels in a straight line within the translucent member 44 from the luminescent center O of the LED light source 12.

Normal reflection sections 34A1 and internal reflection sections 34A2, both constituting a front surface 34A of the translucent member 34, and a plurality of reflection elements 34s formed on a rear surface 34B of the translucent member 34 are completely identical in shape with the translucent member 14 of the embodiment.

Even when the configuration of the second modification is adopted, the same working-effect as that of the embodiment can be yielded.

Further, in the modification, the light incidence recess 34a of the translucent member 34 is formed so as to come into close contact with the sealing resin 12B of the LED light source 12. Hence, the translucent member 34 can be formed readily through insert molding or the like. Further, the positional accuracy of the translucent member 34 can be enhanced.

A third modification of the embodiment will now be described.

Figure 8:
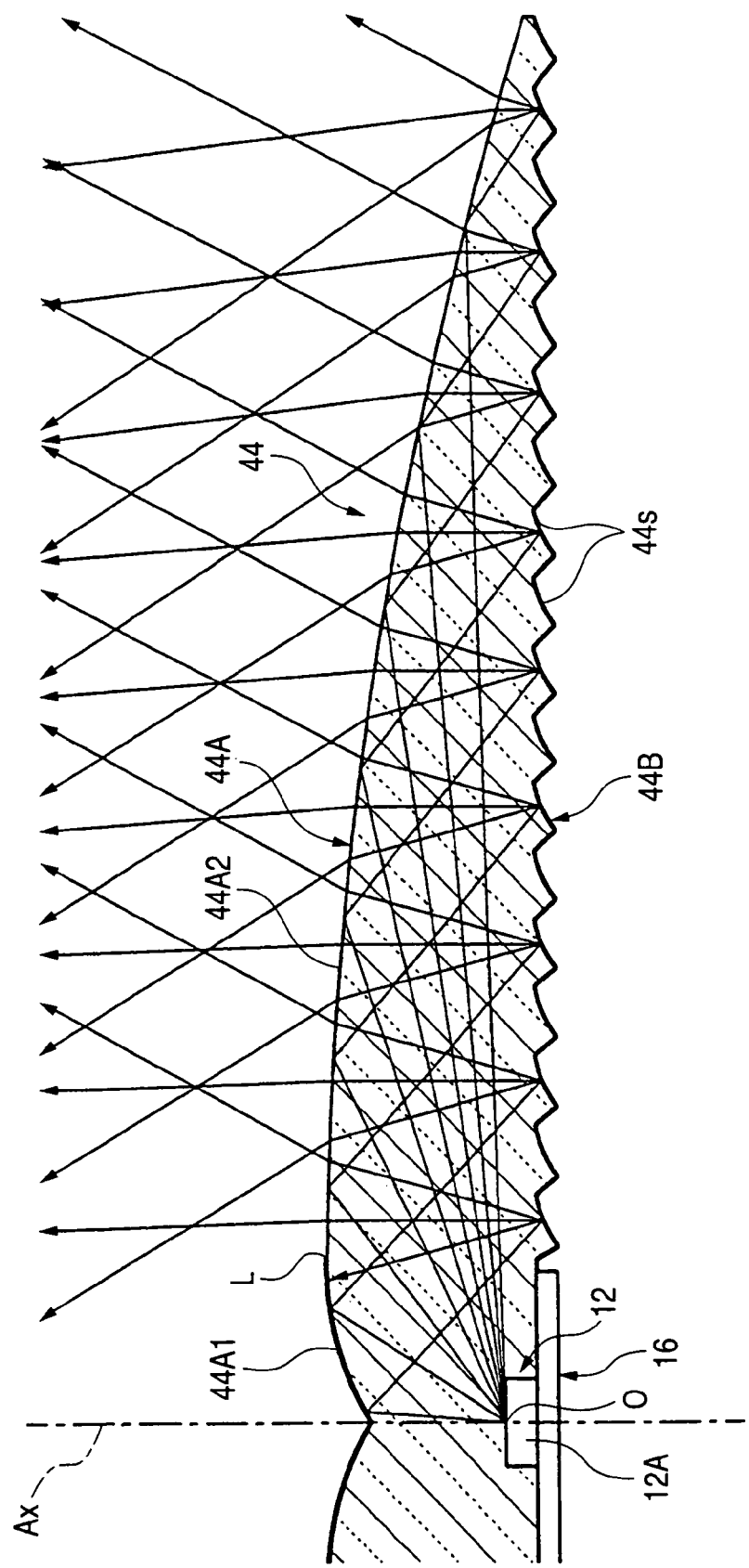
FIG. 8 is a view analogous to FIG. 4, showing a translucent member of a third modification of the embodiment.

FIG. 8 is a view analogous to FIG. 4, showing a translucent member 44 of the third modification.

As illustrated, the translucent member 44 is integrally formed from sealing resin 12B (see FIG. 4) so as to seal the LED main body 12A of the LED light source 12. A light incidence recess, such as the light incidence recess 14a (see FIG. 4) of the translucent member 14 described in connection with the embodiment, is not formed. The outgoing LED light travels radially in a straight line from the luminescent center O of the LED light source 12 within the translucent member 44.

Normal reflection sections 44A1 and internal reflection sections 44A2, both constituting a front surface 44A of the translucent member 44, and a plurality of reflection elements 44s formed on a rear surface 44B of the translucent member 44 are completely identical in shape with the translucent member 14 of the embodiment.

Even when the configuration of the third modification is adopted, the same working-effect as that of the embodiment can be yielded.

In the present modification, the translucent member 44 is formed integrally from the sealing resin 12B of the LED light source 12, thereby enabling a reduction in the number of parts and enhancing the positional accuracy of the translucent member 44.

Fourth and fifth modifications of the embodiment will now be described.

Figure 9:
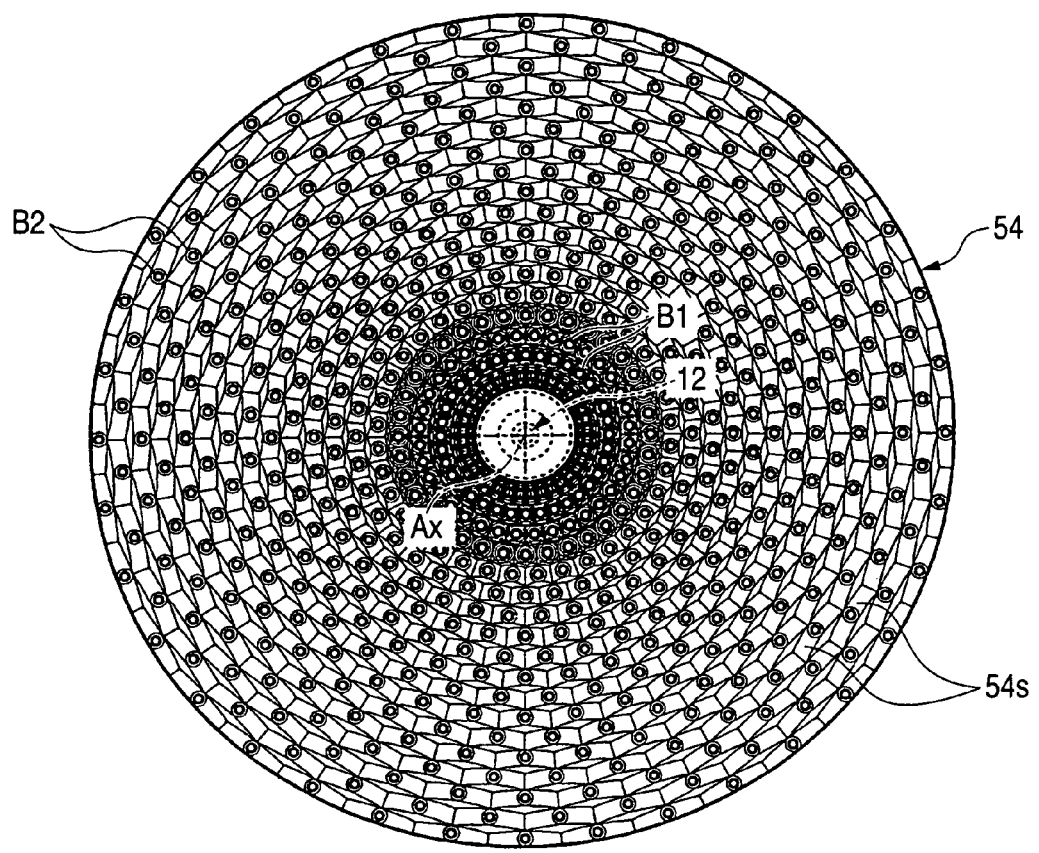
FIG. 9 is a view analogous to FIG. 5, showing a translucent member of a fourth modification of the embodiment.
Figure 10:
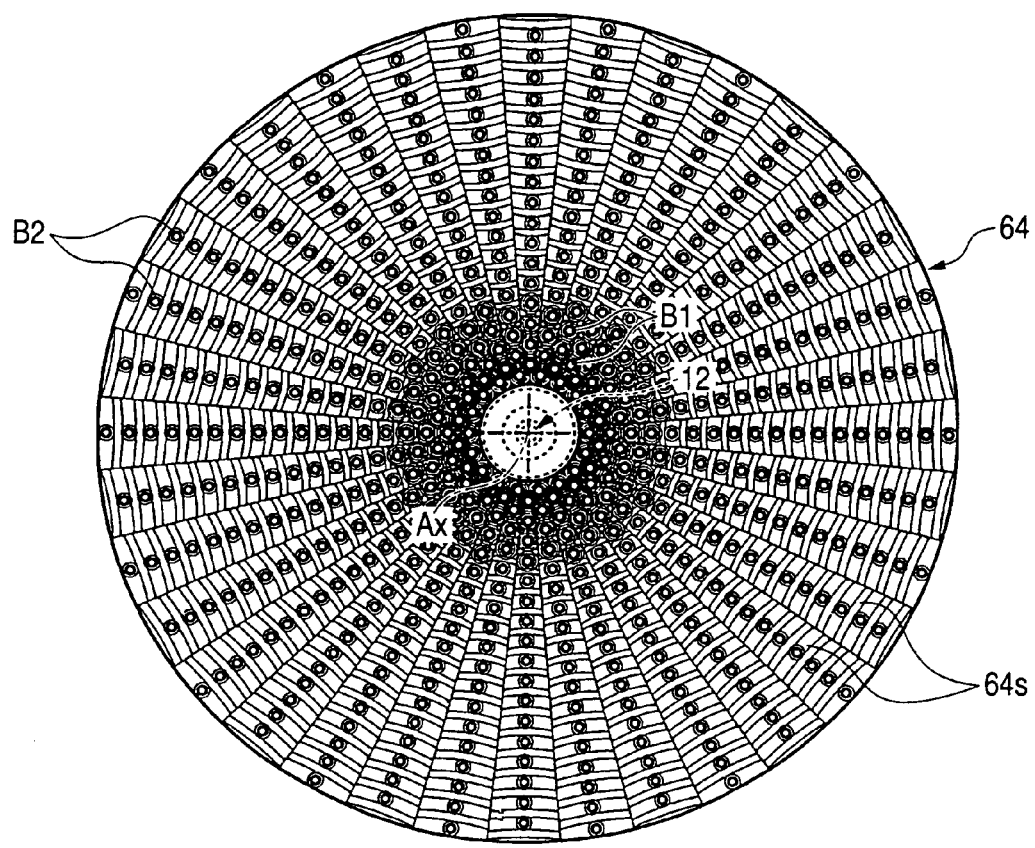
FIG. 10 is a view analogous to FIG. 5, showing a translucent member of a fifth modification of the embodiment.

FIGS. 9 and 10 are views analogous to FIG. 5, showing translucent members 54, 64 of the modifications.

As illustrated, the translucent members 54, 64 of the fourth and fifth modifications are characterized in that a plurality of reflection elements 54s, 64s formed on rear surfaces 54B, 64B differ in arrangement from the translucent member 14 of the embodiment.

Like the translucent member 14 of the embodiment, the translucent members 54, 64 are formed such that rear surfaces 54B, 64B are radially and concentrically separated from each other. Reflection elements 54s, 64s are assigned to the respective rear surfaces 54B, 64B. At that time, in the fourth modification, the respective reflection elements 54s are offset by half a pitch in a circumferential direction on a per-radial-pitch basis. In the fifth modification, the reflection elements 64s are offset by a pitch in a radial direction on a per-circumferential-pitch basis.

The reflection elements 54s, 64s are each formed into a convex curved surface having a predetermined radial curvature and a circumferential radial curvature with respect to the optical axis Ax. In this regard, the modifications are identical with the embodiment. Even with regard to the configuration of the translucent members 54, 64 other than the reflection elements 54s, 64s, the translucent members are the same as that of the embodiment.

When the translucent members 54, 64 are observed from the front while the LED light source 12 is illuminated, substantial centers of the respective reflection elements 54s, 64s constituting the rear surfaces 54B, 64B glow as glaring sections B1, B2. The reflection elements 54s, 64s differ in arrangement from those of the embodiment. Hence, the modifications can provide ways of viewing different from that provided by the embodiment.

The embodiment and the modifications have described a case where the vehicle lamp 10 is a tail lamp. However, even in the case of a vehicle lamp other than the tail lamp (e.g., a stop lamp, a tail/stop lamp, a clearance lamp, or a turning signal lamp), a configuration analogous to that described in connection with the embodiment and the modifications is adopted, whereby working-effects which are the same as those achieved in the embodiment and the modifications can be achieved.

What is claimed is:

1. A vehicle lamp comprising a light source oriented toward the front of the lamp, and a translucent member arranged so as to cause light leaving the light source to enter the translucent member and which is configured to reflect rearward the light that has originated from the light source and entered the translucent member by a front surface of the translucent member and then to reflect the light by a rear surface of the translucent member, to thereby exit the front of the lamp from the translucent member, wherein
   an area on the front surface of the translucent member located in the vicinity of an optical axis of the light source is formed as a normal reflection section subjected to reflection surface treatment, and an area of the front surface of the translucent member other than the normal reflection section is formed as an internal reflection section which causes the outgoing light having entered the translucent member to undergo internal reflection; and wherein
   a plurality of reflection elements are formed on the rear surface of the translucent member for subjecting the outgoing light reflected from the front surface of the translucent member to reflection so as to enter the internal reflection section at an incidence angle which is smaller than or equal to a critical angle.

2. The vehicle lamp according to claim 1, wherein the normal reflection section is formed from a substantially-funnel-shaped rotary curved surface centered on the optical axis, and the internal reflection section is formed from a substantially-annular-dome-shaped rotary curved surface centered on the optical axis.

3. The vehicle lamp according to claim 1, wherein the normal reflection section and the internal reflection section are formed from continuous curved surfaces.

4. The vehicle lamp according to claim 3, wherein a position of a boundary line between the normal reflection section and the internal reflection section is set to a position where an incidence angle of the light which has originated from the light source and entered the front surf ace of the translucent member becomes a substantially critical angle.

5. The vehicle lamp according to claim 4, wherein the plurality of reflection elements are formed at positions rearward of a luminescent center of the light source.

6. A vehicle lamp according to claim 1, wherein the light source is an LED light source.

7. The vehicle lamp according to claim 2, wherein a position of a boundary line between the normal reflection section and the internal reflection section is set to a position where an incidence angle of the light which has originated from the light source and entered the front surface of the translucent member becomes a substantially critical angle.

8. The vehicle lamp according to claim 7, wherein the plurality of reflection elements are formed at positions rearward of a luminescent center of the light source.

9. A vehicle lamp according to claim 8, wherein the light source is an LED light source.

* * * * *